US00RE35559E

United States Patent [19]

Lagreca

[11] E Patent Number: Re. 35,559

[45] Reissued Date of Patent: Jul. 15, 1997

[54] BAG FILTERING UNIT FOR THE DEHYDRATION OF SLUDGES WITH A SUPPORTED VIBRATING DEVICE

[76] Inventor: Graziano Lagreca, Via Mantegna, 62/a, I-20096 Pioltello (Province of Milan), Italy

[21] Appl. No.: 318,268

[22] Filed: Oct. 5, 1994

Related U.S. Patent Documents

Reissue of:

[64] Patent No.: 5,158,672
Issued: Oct. 27, 1992
Appl. No.: 736,883
Filed: Jul. 29, 1991

[30] Foreign Application Priority Data

Feb. 21, 1991 [IT] Italy ..... MI91A0458

[51] Int. Cl.[6] ..... B01D 29/13; B01D 35/20

[52] U.S. Cl. ..... 210/232; 210/198.1; 210/323.2; 210/388; 210/448; 210/484; 210/485

[58] Field of Search ..... 210/97, 86, 110, 210/198.1, 232, 323.2, 388, 448, 485, 486, 452, 134, 219, 744, 779, 483, 345, 484; 55/341.1, 378

[56] References Cited

U.S. PATENT DOCUMENTS

| | | | |
|---|---|---|---|
| 174,297 | 2/1876 | Prange | 210/345 |
| 506,127 | 10/1893 | Malhiot | 210/484 |
| 806,920 | 12/1905 | Rossi | 210/485 |
| 3,955,947 | 5/1976 | Hoon et al. | 210/388 |
| 4,970,004 | 11/1990 | Rosaen | 210/388 |
| 5,053,141 | 10/1991 | Laiho | 210/388 |

FOREIGN PATENT DOCUMENTS

| | | | |
|---|---|---|---|
| 2513539 | 4/1983 | France | 210/485 |
| 952287 | 8/1982 | U.S.S.R. | 210/485 |
| 1095948 | 6/1984 | U.S.S.R. | 210/388 |
| 1161487 | 6/1985 | U.S.S.R. | 210/97 |

*Primary Examiner*—Joseph W. Drodge
*Attorney, Agent, or Firm*—Browdy and Neimark

[57] ABSTRACT

A unit for the dehydration of sludges, particularly for purification plants including a support structure (10) supporting a vibration causing device (24), at least a collection reservoir (11) of sludges positioned above the support structure (10) and having at least one discharge outlet (12) on the bottom, at least a bag-shaped filtering container (14) having an opening engageable to the discharge outlet (12) feeding means (25) to feed the sludges into the collection reservoir (11), collecting means (23) to collect the filtered liquids from the filtering container (14), and at least a control unit (34) to control at least the feeding means (25).

10 Claims, 3 Drawing Sheets

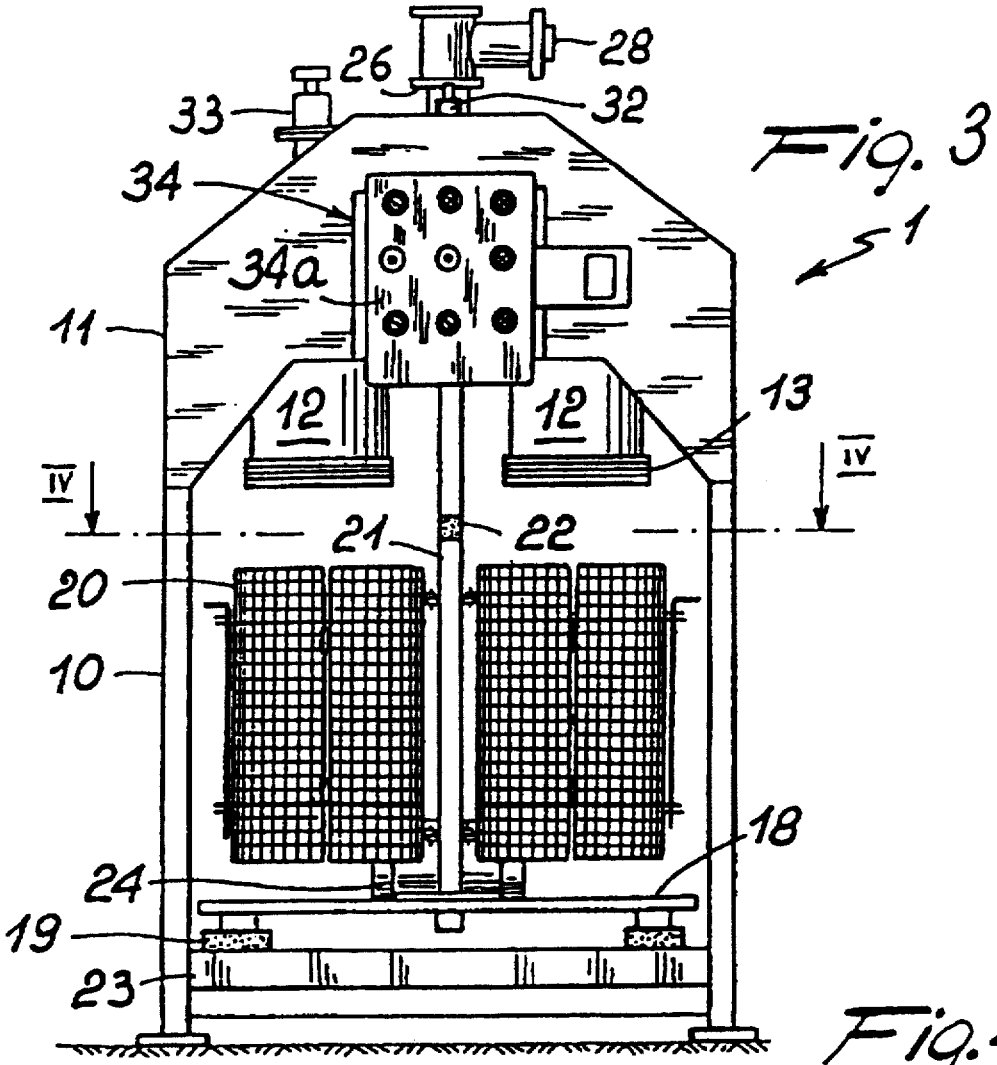
Fig. 3
Fig. 4
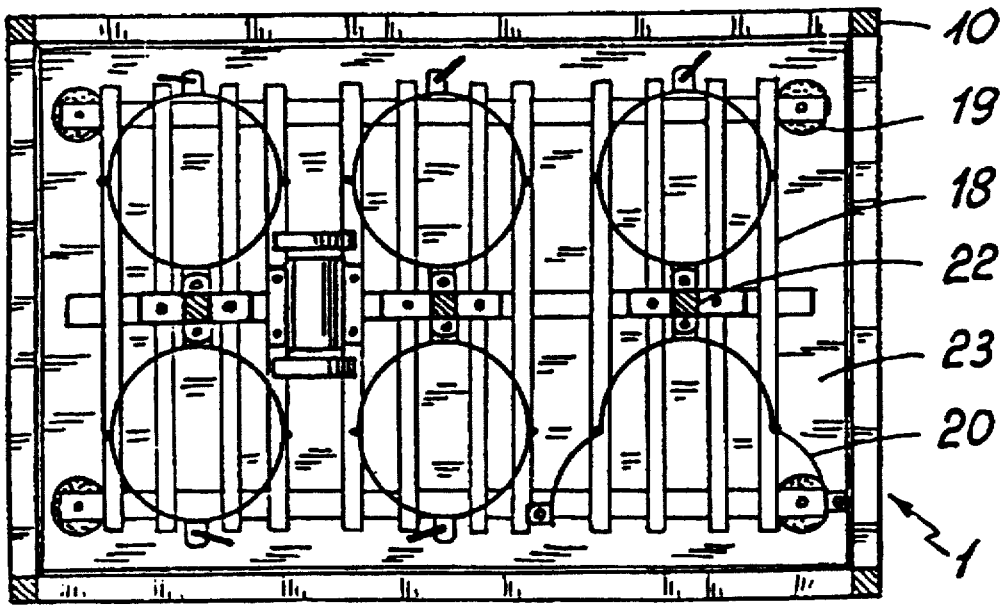

BAG FILTERING UNIT FOR THE DEHYDRATION OF SLUDGES WITH A SUPPORTED VIBRATING DEVICE

Matter enclosed in heavy brackets [ ] appears in the original patent but forms no part of this reissue specification; matter printed in italics indicates the additions made by reissue.

BACKGROUND OF THE INVENTION

The subject of this invention is a unit for the dehydration of sludges, particularly for purification plants.

As it is known, waters and liquids in general which come both from industrial discharges and household type wastes undergo a sequence of treatments aimed at eliminating the largest quantity possible of harmful components from them, before they are dispersed or introduced into drains or the like.

These treatments generally require initial active purification processes of a biological or chemico-physical nature to be carried out on the afore-mentioned waste liquids.

In particular, the initial chemico-physical purification processes, adapted for industrial waste liquids, use suitable coagulant or flocculant substances which favour the formation and precipitation of flocs of sludge.

The sludges obtained in this way are nevertheless still water-rich and therefore are sent to dehydrating equipment, where a treatment consisting of the expulsion of the largest quantity of water possible is carried out.

In this way, one aims to obtain a final harmful product or sludge which is as solid as possible and having a reduced volume to send directly for disposal or to subject to further treatments for elimination.

It is underlined that the reduction in the volume of the sludges obtained by means of dehydration is particularly important in order to reduce the costs of waste disposal of the solid substances obtained as residues and in particular the costs involved in moving and storing them.

Nevertheless, the existing dehydrating equipments, which permit the separation of liquid from the sludge mass, are based essentially on the use of filters able to retain the solid part and let the liquid phase pass through, and these filters, as they have been used up until now, give rise to two fundamental drawbacks; the results are modest and the dehydration times are considerable.

In fact, sludges are obtained which still contain large quantities of liquid and therefore are still extremely cumbersome.

As a result this has a negative effect both on the dimensions of the containers to be used and on the cost of the transport of the residue material obtained.

Furthermore, the operational phase of dehydration of the sludges are rather long, particularly if high percentage yield values are desired.

For example, the formation of water sludges with a percentage of dried product in the region of 20% or less in weight requires numerous days of filtration.

The productivity of current dehydration operations is therefore limited and the running costs are high.

SUMMARY OF THE INVENTION

In this situation, the technical task which forms the basis of this invention is to conceive a unit for the dehydration of sludges which can substantially obviate the mentioned drawbacks.

The technical task specified is substantially achieved by a unit for the dehydration of sludges, particularly for purification plants, including: a support structure, at least a collection reservoir for said sludges located in an above position said support structure and having at least one discharge outlet below, at least one bag-shaped filtering container having a tubular wall, an opening engageable to said discharge outlet and a blind bottom opposite to said opening, feeding means to feed said sludges into said collection reservoir, collection means to collect filtered liquids from said filtering container and positioned underneath of said filtering container, and at least a control unit to control at least said feeding means.

BRIEF DESCRIPTION OF THE DRAWINGS

Further features and the advantages of the invention will become apparent from the following description of a preferred embodiment of a unit for dehydration of sludges, illustrated in the accompanying drawings, where:

FIG. 3 highlights a side view of the same unit; and

FIG. 4 represents a section view according to the plan IV—IV in FIG. 3.

DETAILED DESCRIPTION OF THE INVENTION

Figure 1:
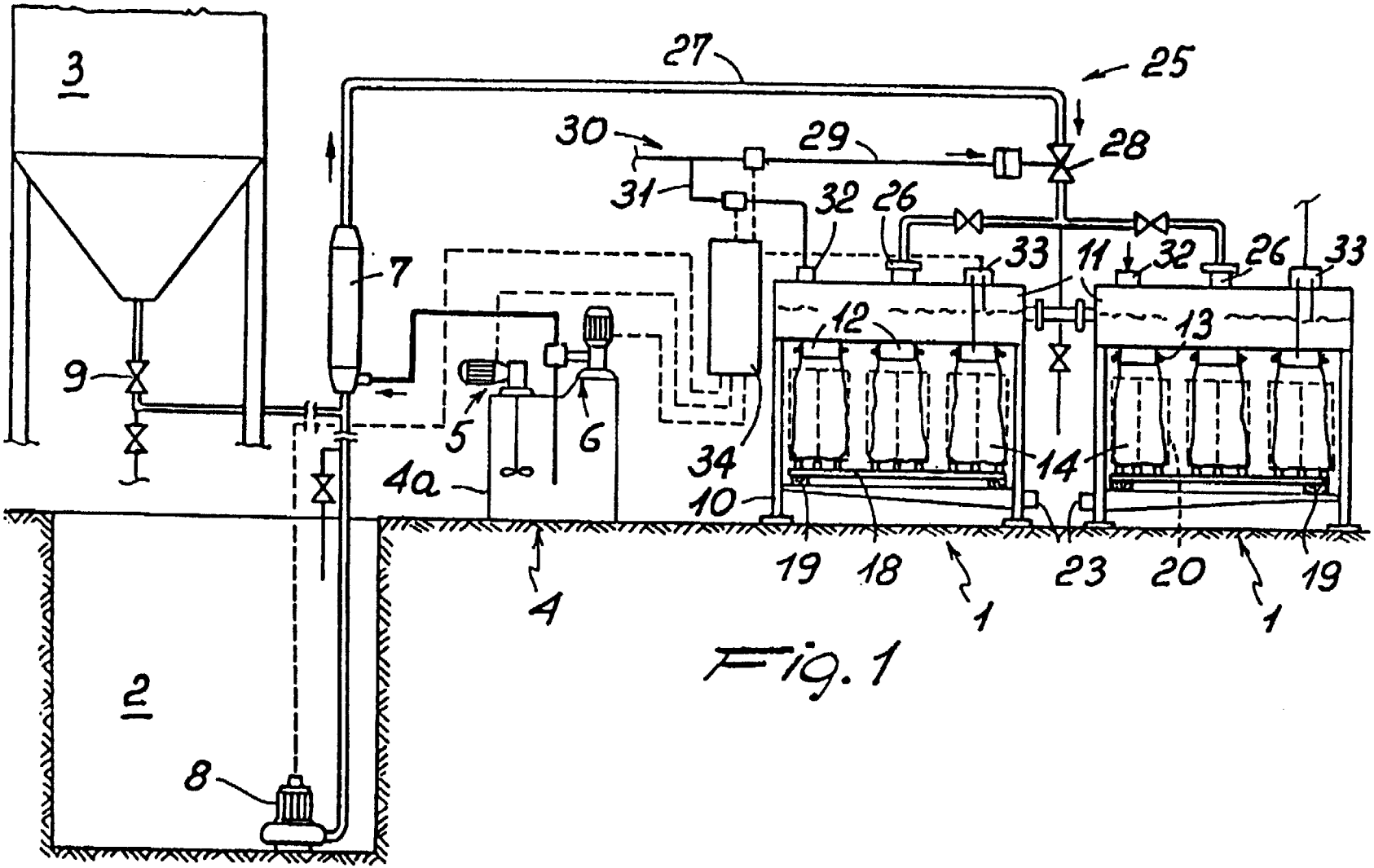
FIG. 1 shows a pair of dehydration units according to the invention, installed in a purification plant.

Making reference to the FIGS. the overall representation of the dehydration unit is designated by the reference numeral 1.

This is installed, as illustrated in FIG. 1, in a purification plant positioned above the unit itself and including a sludge storage tank 2 or a settling tank 3, followed by a flocculation group 4. The latter is equipped with a receptacle 4a, an agitator 5 and a metering pump 6, and sends the flocculant liquid to a static mixer 7 to which the sludges extracted from the storage tank 2 arrives. The sludges are sent by means of [s] *a* sludge pump 8, or they are sent from the settling tank 3 by means of an interception valve 9.

When the settling tank 3 is not in a particularly high-up position there is a pump also at the same tank 3.

The dehydration unit 1 includes a support structure 10 to which a collection reservoir 11 is attached in a raised position. Below the latter, several, for example six, discharge outlets 12 are located, the number of which may vary according to the size and the requirements of the purification plant.

A filtering container 14 at an opening 15, can be attached to each discharge outlet 12, by means of a sealing ring 13. The filtering container 14 is essentially bag-shaped, has a tubular wall 16 and a closed bottom 17 opposite the opening 15, and is made from filtering material which [si] *is* resistant and inert to chemical products and bacteria, such as polypropylene.

The closed bottoms 17 of the filtering containers 14 are in contact with a support grid 18. The latter, in turn, is supported by the support structure 10, preferably with the interplacement of vibration insulators 19, achieved, for example, by blocks of deformable material.

On the outside of each of the filtering containers 14 and at its tubular wall 16, an openable cage 20 is located.

Figure 2:
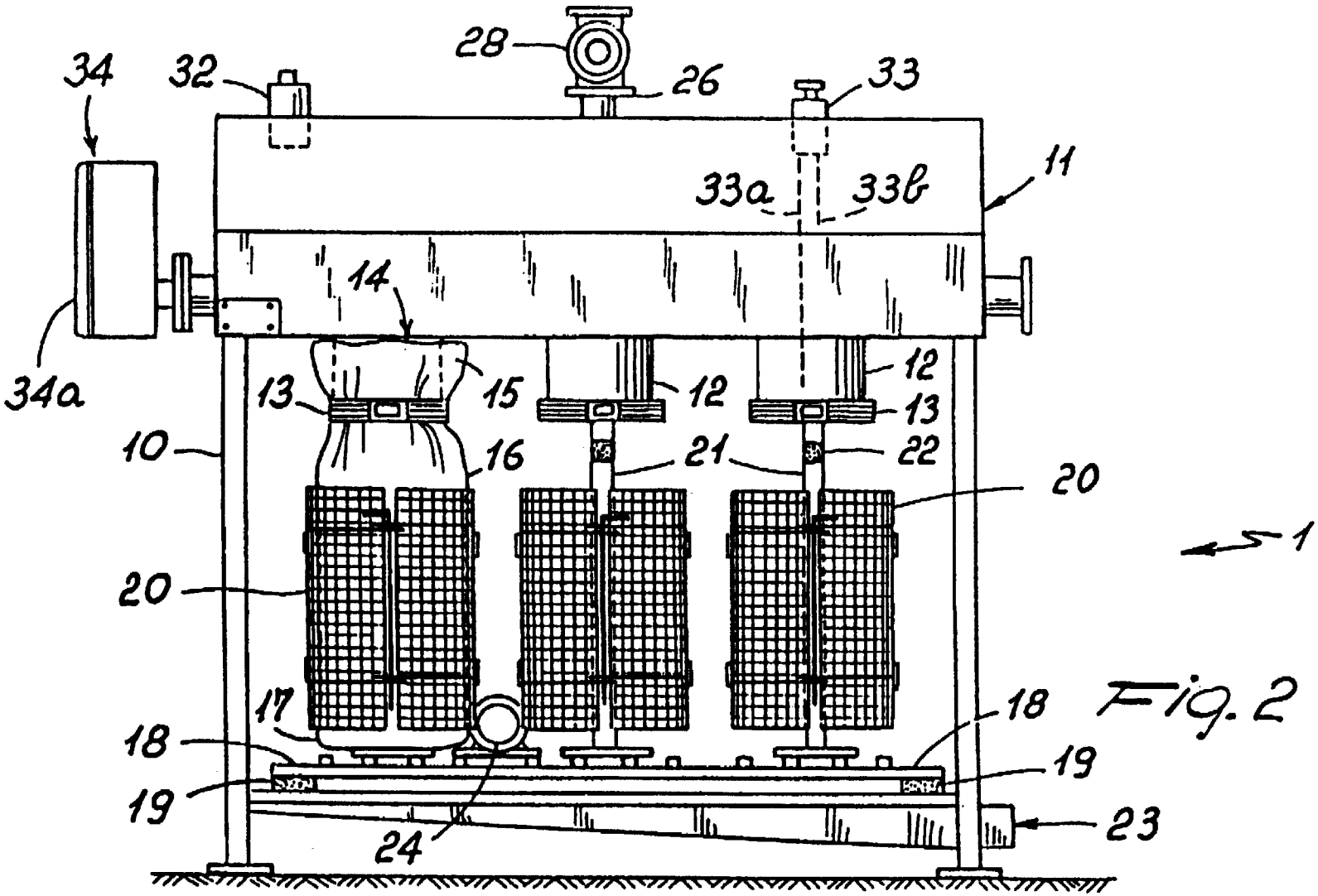
FIG. 2 is a front elevation of a dehydration unit.

The openable [cage] *cages* 20 are positioned in pairs *as best seen in FIG. 3*, with each pair engaged to a support element 21, of the pillar type, linked at the bottom to the support grid 18 and above to the collection reservoir 11. *Each cage 20 is provided with hinges (unnumbered but best seen in FIGS. 2, 3 and 4) so that each such cage can be opened from the side by swinging portions thereof laterally about such hinges as shown in the bottom right hand corner of FIG. 4.*

The support element 21 is interrupted near its upper edge by a deformable junction element 22, which also has the function of insulating from vibrations. Underneath the support grid 18 collection means 23 is located, engaged to the support structure 10, for example realized by a collection tank of the liquids filtered by the filtering containers 14. Vibrations means 24 for the production of vibrations is located upon the same support grid 18.

The vibration means 24 is realized for example by an electric motor which rotates a dynamically instable mass.

Furthermore, feeding means 25 to feed the sludges is placed in the collection reservoir 11 including, in a higher-up position than the latter, a fastening 26 for a pipeline 27 originating from the static mixer 7.

The inflow of sludges into the unit 1 by means of the pipeline 27 is controlled by a feeding valve 28 controlled pneumatically, of the type which is normally in the closed position, into which there is an influx of piloting compressed air by means of the first pipe 29.

On the top of the collection reservoir 11, there is also emission means 30 to emit compressed air, including a second pipe 31 and a three-way directional valve 32, able both to blow compressed air over the top of the sludges in the same collection reservoir 11 and to discharge the compressed air into the atmosphere.

Inside the collection reservoir 11, a level measuring device 33 is located which is able to identify a minimum level and a maximum level of the sludges by means of, respectively, a minimum level probe 33a and a maximum level probe 33b. Finally, alongside the collection reservoir 11 there is a control unit 34, equipped with a control panel 34a. The control unit 34 drives and controls the sludge pump 8, the metering pump 6, the agitator 5, the feeding valve 28, the three-way directional valve 32 and the means for production of vibrations 24. Furthermore, to the same control unit 34 signals arrive from the level measuring device 33.

The operation of the dehydration unit according to the invention is the following.

After having fixed the filtering containers 14 at their opening 15 to the discharge outlets 12, feeding of the sludges is controlled by opening the feeding valve 28. The filtering containers 14 fill up and the filtration of liquid starts through their walls.

In this first phase the level of the sludges inside the collection reservoir 11 increases until it reaches the maximum level indicated by the maximum level probe 33b. The filling of the filtering containers 14 initially occurs therefore by gravity and is promoted by the height of the surface of the material present in the collection reservoir 11.

The signals sent out by the maximum level probe 33b enable the control unit 34 to drive the closing of the feeding valve 28, the blowing of compressed air into the collection reservoir 11 by means of the three-way directional valve 32, in order to form a cushion of compressed air on top of the same sludges, and the insertion of the vibration means 24 which vigorously shakes the filtering containers 14.

In this way both the compressed air which presses the sludge, and the vibrations, promote consistent acceleration of the filtering process and therefore the expulsion of liquids from the filtering containers.

The openable cages co-operate actively in this second phase by keeping the filtering containers 14 in place. When the sludge reach the minimum level indicated by the minimum level probe 33a, the control unit 34 drives the interruption of the blowing of compressed air into the collection reservoir 11 and sucks it out into the atmosphere from the latter, in order to restore the internal pressure of the collection reservoir 11 to the atmospheric pressure. It is therefore possible the feeding of other sludge to the collection reservoir 11.

Subsequently the operations looked at above are repeated until such time as the filtering containers 14 are completely saturated and require to be replaced. The process of filling of the filtering containers 14 normally only lasts a few hours.

It has been shown that the operations of feeding the sludges into the filtering containers 14 can be limited to 4–5 hours, followed by no more than 6–7 of filtration, during which time a 25% reduction in weight of dried product can easily be reached, inside the filtering containers 14.

The filtering containers 14 are then removed from the discharge outlet 12 to which they were attached and the openings closed over with suitable strings.

The sludges at this point are filtered and packed inside the filtering containers 14. The liquid accumulated in the collection tank 223 is, depending on the case, let out directly into drains, or sent once again to purification plants.

The filtering containers 14 are piled on boards and can be stacked even in the open air.

The natural evaporation of the liquid phase enables a dry, hard product to be obtained, without further treatment, which contains up to 80% of dry substance.

The boards which are loaded with material which is now dry and therefore much reduced in weight and volume can thus be easily sent by normal methods of transport for disposal. The invention has important advantages.

In particular, it is underlined the speed of the filtration obtained by the dehydration unit according to this invention.

In conclusion, it results in higher productivity, reduced running costs and the problems caused by the movement of sludges with high percentages of water are in practice eliminated.

I claim:

1. A unit constructed and arranged for dehydration of sludges comprising:

a support structure (10), a collection reservoir (11) for said sludges located above said support structure (10) and having at least one discharge outlet (12) below, at least one bag-shaped filtering container (14) having a tubular wall (16), an opening engageable to said discharge outlet (12) and a closed bottom (17) opposite to said opening, a support grid (18) supporting said closed bottom (17) supported by said support structure (10), feeding means (25) for feeding said sludges into said collection reservoir (11), collection means (23) for collecting filtered liquids from said at least one filtering container (14) and positioned underneath of said support grid (18), vibration means 924) for producing vibrations and for vibrating said supporting grid (18), and vibration insulators (19) placed between said support grid (18) and said support structure (10).

2. A unit according to claim 1, further comprising emission means (30) for blowing compressed air into said collection reservoir (11), to establish compressed air above said sludges in said collection reservoir (11).

3. A unit constructed and arranged for dehydration of sludges comprising:

a support structure (10), a collection reservoir (11) for said sludge located above said support structure (10) and having at least one discharge outlet (12) below, at least one bag-shaped filtering container (14) having a tubular wall (16), an opening engageable to said discharge outlet (12) and a closed bottom (17) opposite said opening, an openable cage (20) located outside said tubular wall (16) of said at least one filtering container (14), support elements (21) of said openable cage (20) supported by said support structure (10), feeding means (25) for feeding said sludges into said collection reservoir (11), collection means (23) for collecting filtering liquids from said at least one filtering container (14) and positioned underneath of said at least one filtering container (14), vibration means (24) for producing vibrations and for vibrating said openable cage (20), and vibration insulators (19) placed between said support structure (10) and said support elements (21).

4. A unit according to claim 3, further comprising emission means (30) for blowing compressed air into said collection reservoir (11), to establish compressed air above said sludges in said collection reservoir (11).

5. A unit constructed and arranged for dehydration of sludges comprising:

a support structure (10), a collection reservoir (11) for said sludges located above said support structure (10) and having at least one discharge outlet (12) below, at least one bag-shaped filtering container (14) having a tubular wall (16), an opening engageable to said discharge outlet (12) and a closed bottom (17) opposite said opening, said support structure (10) supporting said closed bottom (17), feeding means (25) for feeding said sludges into said collection reservoir (11);

collection means (23) positioned underneath of said at least one filtering container (14), and

[vibratoin] *vibration* means (24) supported by said support structure (10) for producing vibrations and for vibrating said at least one filtering container (14), said vibration means (24) including an electric motor vibrating at least one closed bottom (17).

6. A unit according to claim 5, further comprising vibration insulator means (19) for insulating a part of said supporting structure (10) supporting said at least one filtering container (14).

7. Unit constructed and arranged for dehydration of sludges comprising:

a support structure (10), a collection reservoir (11) for said sludges located above said support structure (10) and having at least one external discharge outlet (12) below, and a level measuring device (33) to measure the level of said sludges in said collection reservoir (11), at least one bag-shaped filtering container (14) placed externally to said collection reservoir (11) and having a tubular wall (16), an opening engageable to said discharge outlet (12) and a closed bottom (17) opposite said opening, a support grid (18) beneath said closed bottom (17) and supported by said support structure (10), said support grid (18) directly supporting said closed bottom (17), an openable cage (20) located outside said tubular wall (16) of said at least one filtering container (14), and enclosing said tubular wall (16), support elements (21) of said openable cage (20) between said support grid (18) and said collection reservoir (11), emission means (30) for blowing compressed air into said collection reservoir (11), to establish compressed air above said sludges, feeding means (25) for feeding said sludge into said collection reservoir (11), and collection means (23) for collecting filtering liquids from said at least one filtering container (14) and positioned underneath of said support grid (18), said support grid (18) and said openable cage (20) substantially surrounding and supporting said at least one filtering container (14).

*8. A unit constructed and arranged for dehydration of sludges comprising:*

*a support structure (10),*

*a collection reservoir (11) for said sludges located above said support structure (10) and having at least one discharge outlet (12) below,*

*at least one bag-shaped filtering container (14) having a tubular wall (16), an opening engageable to said discharge outlet (12) and a closed bottom (17) opposite to said opening,*

*a support grid (18) supporting said closed bottom (17) supported by said support structure (10),*

*for each said filtering container, there being an openable cage (20) substantially surrounding and circumferentially supporting said tubular wall (16) of said filtering container (14) and having hinged sections which are swingable laterally to open said cage (20),*

*feeding means (25) for feeding said sludges into said collection reservoir (11); and*

*collection means (23) for collecting filtered liquids from said at least one filtering container (14) and positioned underneath of said support grid (18).*

*9. A unit constructed and arranged for dehydration of sludges comprising:*

*a support structure (10),*

*a collection reservoir (11) for said sludges located above said support structure (10) and having at least one discharge outlet (12) below,*

*feeding means (25) for feeding said sludges into said collection reservoir (11),*

*at least one bag-shaped filtering container (14) having a tubular wall (16), an opening engageable to said discharge outlet (12), and a closed bottom (17) opposite said opening,*

*a laterally openable cage (20) for each said bag-shaped filtering container (14) located outside said tubular wall (16) and in circumferential supporting relationship therewith and having hinged sections which are swingable laterally, and*

*collection means (23) positioned underneath of said at least one filtering container (14).*

*10. Unit constructed and arranged for dehydration of sludges comprising:*

*a support structure (10),*

*a collection reservoir (11) for said sludges located above said support structure (10) and having at least one external discharge outlet (12) below, and a level measuring device (33) to measure the level of said sludges in said collection reservoir (11);*

*at least one bag-shaped filtering container (14) placed externally to said collection reservoir (11) and having a tubular wall (16), an opening engageable to said discharge outlet (12) and a closed bottom (17) opposite said opening,*

*a support grid (18) beneath said closed bottom (17) and supported by said support structure (10), said support grid (18) supporting said closed bottom (17) of each said at least one filtering container,*

*for each said at least one filtering container there being an openable cage (20) located outside said tubular wall (16) of said filtering container (14), and enclosing said tubular wall (16), said openable cage (20) substantially surrounding and circumferentially supporting said filtering container (14) and having hinged sections which are swingable laterally,*

*a support element (21) for said openable cage (20) between said support grid (18) and said collection reservoir (11),*

*feeding means (25) for feeding said sludge into said collection reservoir (11), and*

*collection means (23) for collecting filtering liquids from said filtering container (14) and positioned underneath of said support grid (18).*

* * * * *